United States Patent [19]

Reilly et al.

[11] 4,326,873

[45] Apr. 27, 1982

[54] PROCESS FOR THE MANUFACTURE OF FUSED POLYPHOSPHATE GLASSES

[75] Inventors: Phillip B. Reilly, Mountain Lakes, N.J.; Paul H. Ralston, Bethel Park, Pa.

[73] Assignee: Calgon Corporation, Pittsburgh, Pa.

[21] Appl. No.: 137,053

[22] Filed: Apr. 3, 1980

[51] Int. Cl.³ ................................................ C03C 3/16
[52] U.S. Cl. ........................................ 65/134; 65/66; 65/136; 423/312; 501/45
[58] Field of Search ........................... 65/66, 136, 134; 423/312; 106/47 R

[56] References Cited

U.S. PATENT DOCUMENTS 2,460,356  2/1949  Kreidl et al. ............................ 65/66
2,574,047  11/1951  Mackenzie ...................... 423/312 X
2,601,395  6/1952  Hatch .
3,284,368  11/1966  Hatch .................................. 252/389

*Primary Examiner*—Arthur D. Kellogg
*Attorney, Agent, or Firm*—Mario A. Monaco; Martin L. Katz; R. Brent Olson

[57] ABSTRACT

Process for the manufacture of fused polyphosphate glasses in which a hydrocarbon is used as the carrier for the slurry of reactants that are fed to the high temperature furnace.

5 Claims, No Drawings

PROCESS FOR THE MANUFACTURE OF FUSED POLYPHOSPHATE GLASSES

Polyphosphate glasses, as for example, those disclosed in U.S. Pat. Nos. 2,601,395 and 3,284,368 are used in scale and corrosion inhibiting compositions for the treatment of a variety of aqueous systems. They are presently produced by means of an aqueous slurry of phosphoric acid, soda ash and di- or tri-valent metal oxides or salts, such as calcium oxide or aluminum oxide, which are fed to a high temperature furnace. Water, carbon dioxide and volatile gases are liberated and the anhydrous components are fused and released to a cooling source where a quenching operation yields a solid glass. This process requires a substantial amount of energy to drive off the water in the aqueous slurry and the phosphoric acid.

Accordingly, it is an object of this invention to provide a process for the manufacture of fused polyphosphate glasses which does not use an aqueous carrier and/or reduces the amount of water in the source of the phosphoric acid.

It is a further object of this invention to provide a process for the manufacture of fused polyphosphate glasses that does not require as much energy as presently used processes.

It is another object of this invention to provide a process for the manufacture of fused polyphosphate glasses that reduces the production time.

These and other objects of this invention are accomplished by a process in which a liquid hydrocarbon energy source, for example, No. 2 fuel oil, is substituted for part, or all, of the aqueous phase of the reactant slurry.

In the process of this invention, soft water is replaced completely, or in part, with a liquid hydrocarbon. This liquid hydrocarbon or hydrocarbon/water mixture is circulated in a mix tank and the required amount of phosphorous-containing component or components, such as orthophosphoric acid, phosphorous pentoxide or phosphorous-containing salts, are added. Then the desired amounts of mono-valent, di-valent or tri-valent metal oxide or salt is added to obtain the desired solution rate or ratio of metal oxide to phosphorous pentoxide ($P_2O_5$). This well-mixed slurry containing the dispersed solids is then fed to the furnace where the liquid hydrocarbon burns and serves as an energy source. At the same time, any water or volatile gases are released and the anhydrous reactants are fused. The molten charge is then fed to a cooling source where it solidifies as a glassy composition.

The invention may be illustrated by the following representative examples.

EXAMPLE 1

A slurry was prepared which on dehydration and fusion would yield sodium polyphosphate (1.1 $Na_2O$:1 $P_2O_5$) glass. The soda ash ($Na_2CO_3$) was dispersed in No. 2 fuel oil and the slurry was mixed with 80 percent orthophosphoric acid ($H_3PO_4$). The ratio of oil:soda ash:80 percent $H_3PO_4$ was about 1:1.6:3.2.

Before melting these slurry components in a platinum dish in the laboratory furnace, a preliminary dehydration step on a hot plate was carried out to eliminate spattering.

Following the primary dehydration step, the reactants were placed in the furnace at 800° C. until they were molten. Then the liquid reaction product was cast on a metal surface (without top quench). The resulting solid product was a clear glass.

EXAMPLE 2

A slurry was prepared which contained No. 2 fuel oil, soda ash and phosphorous pentoxide ($P_2O_5$) at a ratio of 1:1.6:1.9. The viscous slurry of phosphorous pentoxide-soda ash-fuel oil, contained in a platinum dish, was placed in a furnace at 800° C. until the reactants had fused. Then the molten sodium polyphosphate product was cast on a metal surface without top quenching and a clear glass product was obtained.

EXAMPLE 3

A slurry was prepared with No. 6 fuel oil, 80 percent orthophosphoric acid, soda ash and calcium oxide at a ratio of 1:3.5:0.7:0.5. Following low temperature dehydration, the reactants were placed in a furnace at 1000° C. until molten. The reaction product was then cast on a cooling surface and a sodium calcium polyphosphate glass resulted.

We claim:

1. A process for the manufacture of polyphosphate glasses which comprises forming a slurry of a liquid hydrocarbon, soda ash, alone or in combination with a di-valent metal oxide, and a source of phosphoric acid; melting the reaction mixture; and quenching the product.

2. A process as in claim 1 wherein the slurry contains a liquid hydrocarbon, soda ash and orthophosphoric acid.

3. A process as in claim 1 wherein the slurry contains a liquid hydrocarbon, soda ash and phosphorous pentoxide.

4. A process as in claim 1 wherein the slurry contains a liquid hydrocarbon, soda ash, calcium oxide and orthophosphoric acid.

5. A process as in claim 1 wherein the slurry contains a liquid hydrocarbon, soda ash, calcium oxide, magnesium hydroxide and orthophosphoric acid.

* * * * *